United States Patent Office 3,272,757
Patented Sept. 13, 1966

3,272,757
PROCESS OF BREAKING REVERSED EMULSIONS
Willard H. Kirkpatrick, Sugar Land, and Virgil L. Seale, Houston, Tex., assignors to Nalco Chemical Company, Chicago, Ill., a corporation of Delaware
No Drawing. Original application Jan. 7, 1963, Ser. No. 249,617. Divided and this application Aug. 3, 1964, Ser. No. 387,185
11 Claims. (Cl. 252—344)

This application is a division of our copending application Serial No. 249,617, filed January 7, 1963.

This invention, in general, relates to the breaking of reversed emulsions. More particularly, the invention is concerned primarily with the breaking or resolution of petroleum oil-in-water emulsions through employment of polyelectrolyte compounds and compositions useful for this purpose.

Most naturally occurring emulsions of petroleum oil and water take the form of a water-in-oil emulsion in which the oil is the continuous phase and tiny droplets of water are dispersed in the oil. Occasionally, however, reversed emulsions are encountered either in the production, handling or refining of petroleum oil or fractions thereof. Reversed emulsions are of a character quite different from the usual water-in-oil emulsions and must be treated in a different manner with different chemicals in order to resolve the reversed emulsion into its oil and water phases.

This invention pertains primarily to the breaking or resolution of such reversed emulsions by the treatment of these emulsions with relatively high molecular weight, polyelectrolyte condensates produced by the condensation of dipropylene triamine heavy ends and epichlorohydrin or certain derivatives of these compounds or other polyalkylene polyamines.

This invention contemplates employment of the polycondensates of (a) polyalkylene polyamines of the formula $H_2N—[R—NH]_{2-9}H$ wherein R is ethylene, propylene-1,3, or propylene-1,2, such as diethylene triamine, triethylene tetramine, tetraethylene pentamine, dipropylene triamine, tripropylene tetramine, tetrapropylene pentamine, and higher members of the polyethylene and polypropylene polyamine series having up to about 10 amino groups, as well as mixtures thereof, and epichlorohydrin, (b) epichlorohydrin and a precondensate of said polyalkylene polyamines and polyoxyalkylene glycols in which the oxyalkylene groups consist solely of oxyethylene groups or both oxyethylene and oxypropylene groups, (c) said polyalkylene polyamines, epichlorohydrin, and an epichlorohydrin adduct of an aliphatic glycol such as diethylene glycol 1,3-butylene glycol, polyalkylene glycols having 2-4 carbons per alkylene group, etc., and (d) an epichlorohydrin adduct of an aliphatic glycol such as diethylene glycol, 1,3-butylene glycol, or the like and said polyalkylene polyamines.

All of the foregoing products yield polycondensates having a molecular weight of at least 1000 and usually not higher than 20,000. The polycondensate contains a plural number of electrolyte groups which are believed to be formed at the site of the amino nitrogens of the polyalkylene polyamine. Polyethylene polyamines with 3–5 amino nitrogens and dipropylene triamine are available in commercial quantities in substantially pure form. Higher members of the polyethylene polyamine series and of the dipropylene triamine series are available usually as mixtures of members of the series, usually in the form of residues left after distillation. One example of such residues is a poduct known in the trade as dipropylene triamine heavy ends. Dipropylene triamine heavy ends are derived from a commercial process which produces 1,2-propylene diamine from ammonia and 1,2-propylene dichloride. This process is analogous to the production of the polyethylene amines from ammonia and ethylene dichloride. However, due to the difference in reactivity of one of the chlorines in 1,2-propylene dichloride, the process is different in a significant degree. The so-called heavy ends are a blend of the light ends and the residue obtained upon fractionation of dipropylene triamine. The approximate composition is: propylene diamine, trace; water, 7%; monoisopropanolamine, 30%; tripropylene tetramine and higher polypropylene polyamines, remainder.

In addition to the foregoing, the invention also contemplates blends of the aforesaid polyelectrolytes with strong inorganic electrolytes, notably amphoteric aluminum and zinc salts. Amphoteric metal salts such as zinc chloride have long been used in oil fields to resolve reversed emulsions, i.e., dispersions of oil droplets in the aqueous, continuous phase. In general, the inorganic electrolytes suitable for purposes of this invention are described in U.S. Patent No. 2,915,476. The polyelectrolytes of the invention have excellent compatibility with inorganic electrolyte salts of amphoteric metals, such as zinc chloride and aluminum chloride. This compatibility is traceable to the epichlorohydrin component of the polyelectrolyte condensates inasmuch as tests have shown that a polycondensate produced by condensing a polyamine with ethylene dichloride are not compatible with inorganic electrolytes such as zinc chloride. It appears that this compatibility is, at least in part, attributable to the oxygen provided in the polycondensates of the invention by the epichlorohydrin component. Additional tests have shown that it is even more desirable to have at least a portion of the oxygen in the polycondensates of the invention present in the form of ether oxygens rather than as hydroxyl oxygens, the latter form being the form yielded by epichlorohydrin in the polycondensates of the invention. Therefore, in the most preferred forms of the invention, at least a portion of the polycondensate molecules contain ether oxygens which are supplied by the polyoxyalkylene glycol components, diethylene glycol, 1,3-butylene glycol and the like. The polyoxyalkylene glycols fall in the class

$$HO(C_nH_{2n}O—)_xH$$

wherein $n$ is 2–4 and $x$ is at least two and generally not more than about 50. Polyoxyalkylene glycols containing two types of oxyalkylene groups, e.g., oxyethylene and oxypropylene-1,2; oxyethylene and oxybutylene-1,2; etc., are included in the above defined polyalkylene glycols.

In instances where a glycol such as diethylene glycol is used, the epichlorohydrin is used as a difunctional polymerizing agent to convert the glycol to a monofunctional or difuncttional halohydrin derivative, which then reacts in the presence of a highly basic amine to form an epoxy derivative, which then adds to the amine, to form a substituted amine hydrochloride.

The procedure for producing a precondensate of the polyalkylene polyamine and a polyoxyalkylene glycol chloride is one involving the reaction between the chloro group of the latter and an amino hydrogen of the polyalkylene polyamine whereby the polyoxyalkylene group is attached or joined to the polyalkylene polyamine at an amino hydrogen. Polyethylene glycol chlorides which can be used for this purpose are those having a molecular weight in the range of about 100–800. They are precondensed by heating a mixture of the two compounds to a temperature in the order of 110–160° C. for a period of 15 minutes to 2 hours.

In order to produce the polycondensates of the invention, the precondensate is reacted with epichlorohydrin at a mol ratio of 1.5 to 2.0 mols of epichlorohydrin per mol of the precondensate. The reaction is usually conducted with the slow addition of epichlorohydrin at a temperature held below about 100° C. until all of the epichlorohydrin has been added. The reaction mixture is then refluxed, usually after the addition of water to the reaction mixture for a period of about one-half to one hour. The resultant product is an aqueous solution of the polycondensate.

In the case of polyethylene polyamines, the condensation reaction mixture should have sufficient water to give a reflux temperature in the range of about 110° F. to 120° F. The water preferably is added before beginning the epichlorohydrin addition.

The polycondensates produced only from the polyalkylene polyamine and epichlorohydrin are prepared in an aqueous medium at a weight ratio of 1 to 1.5 parts of polyalkylene polyamine per part of epichlorohydrin. In this instance, the epichlorohydrin addition is also made slowly to a solution of the polyalkylene polyamine at a temperature held in the range of about 80–100° C. After the addition of the epichlorohydrin is completed, the reaction mixture is refluxed for a period of about ½ to 4 hours. The resultant product is an aqueous solution of polycondensate of epichlorohydrin and the polyalkylene polyamine.

With polyelectrolytes of the invention prepared from epichlorohydrin, polyalkylene polyamine and a precondensate of diethylene glycol, 1,3-butylene glycol, or a polyoxyalkylene glycol and epichlorohydrin, the latter precondensate is prepared by reacting the glycol with epichlorohydrin at a mol ratio in the range of 1:1 to 1:2.2, respectively, preferably a mol ratio of about 1:2, respectively. The precondensation reaction is conducted in the presence of a free radical catalyst such as a boron trifluoride etherate complex by slowly adding the epichlorohydrin to a mixture of the diethylene glycol, 1,3-butylene glycol or polyoxyalkylene glycol and the catalyst. The temperature during the addition period preferably is held in the range of 80–110° C. After all the epichlorohydrin is added, the reaction mixture is held at a temperature in the order of 90–130° C. for a sufficient time to assure complete reaction of the epichlorohydrin and the glycol. This period is usually in the order of ½ to 1 hour. The resultant precondensate is essentially a monomeric compound in which the epichlorohydrin is attached to the diethylene glycol or polyethylene glycol by reaction occuring at the hydroxyl groups.

This precondensate is thereafter reacted with polyalkylene polyamine and an additional amount of epichlorohydrin at a weight ratio of 1 to 3 parts of the aforesaid precondensate and .5 to 1 part of additional epichlorohydrin per part of polyalkylene polyamine. The reaction preferably is conducted in an aqueous medium at least approximately the reflux temperature of the reaction mixture for a period of one to four hours.

A similar polyelectrolyte of the invention can be produced by a reaction between the aforesaid glycol-epichlorohydrin precondensate and polyalkylene polyamine without the addition of additional epichlorohydrin. This reaction preferably is conducted at a temperature in the order of 130–180° C. for a period of one-half to four hours, including the time of addition of the precondensate to the polyalkylene polyamine when such procedure is used.

Having described the invention in its generic aspects, the invention will be further understood with the aid of the following specific examples.

EXAMPLES I

In a three-necked flask fitted with a means of agitation, a thermometer, an addition tube, and reflux condenser, was placed 400 gms. of the product known as dipropylene triamine heavy ends, and 250 gms. of a polyethylene glycol chloride having a molecular weight of approximately 400. These materials were heated to a temperature of 140° C. and held at this temperature for a period of 30 minutes. At the end of this time the product was cooled to 78° C., and an epichlorohydrin addition was begun in a portion-wise manner, the addition being made in approximately 25 ml. quantities at temperatures between 90–100° C. When a total of 175 mls. or approximately 210 gms. of epichlorohydrin had been added, it was necessary to add 100 mls. of water to reduce the viscosity of the product. The epichlorohydrin was continued until a total of 300 gms. had been added to the product over a period of two hours. When the epichlorohydrin addition was completed an additional 285 gms. of water was added and the material heated at reflux temperature, approximately 115° C., for an additional period of 30 minutes. The final product was then further adjusted with water to give a finished polyelectrolyte containing 47.7% active material.

EXAMPLE II

In a manner similar to Example I, 400 gms. of dipropylene triamine heavy ends, 250 gms. polyethylene glycol chloride 400, 350 gms. epichlorohydrin, in the presence of 425 gms. water were reacted to give a polyelectrolyte similar to Example I, but having a higher molecular weight as evidenced by the greater viscosity contributed by the 50 gms. of additional epichlorohydrin used. The material as prepared was diluted with water to a final product containing approximately 47% active material.

EXAMPLE III

In a manner similar to Example I, 400 gms. of dipropylene triamine heavy ends, 160 gms. of a polyethylene glycol chloride having a molecular weight of approximately 100, and 350 gms. of epichlorohydrin were reacted in the presence of 410 gms. of water as a solvent. The final product was further diluted with water to give a polyelectrolyte containing 46% active material.

EXAMPLE IV

In a manner similar to Example I, 400 gms. of dipropylene triamine heavy ends and 400 gms. of epichlorohydrin were reacted in the presence of 420 gms. of water as a solvent. The epichlorhydrin addition was made at temperatures in the range of 80–100° C. over a period of 5 hours. At the end of this time the material was then refluxed for two hours at a temperature of approximately 112° C. At the end of this reflux time, the product was further diluted with water to a final product containing approximately 45% active material.

EXAMPLE V

In a manner similar to Example I, 400 gms. of dipropylene triamine heavy ends, 300 gms. of the product of Intermediate Example I, supra, and 295 gms. of epichlorohydrin were reacted in the presence of 435 gms. of water as a solvent. After reflux at 115° C. for a period of 2 hours the product was further diluted with water to give a finished polyelectrolyte containing approximately 46% active material.

EXAMPLE VI

In a manner similar to Example I, 300 gms. of dipropylene triamine heavy ends, 300 gms. of the product of Intermediate Example I, supra and 278 gms. of epichlorohydrin were reacted in the presence of 418 gms. of water as a solvent.

On heating at reflux temperatures it was noted that unreacted epichlorohydrin was present. During a period of two hours reflux a total of 15 mls. of epichlorohydrin was recovered. At the end of this reflux period the product was further diluted with water to give a finished polyelectrolyte containing 45% active material.

EXAMPLE VII

Into a reaction set up as described in Example I was charged 300 gms. dipropylene triamine heavy ends. This material was heated to 100° C. and continuous drop-wise addition of 450 gms. of the product of Intermediate Example I was begun. An exothermic reaction began immediately to take place and the addition was completed at a temperature of 160° C. over a period of 50 minutes. When the addition had been completed the material was allowed to cool to 125° C. and 260 gms. of water was added slowly. After the product had been cooled to approximately 90° C. it was further diluted with water to give a finished polyelectrolyte containing approximately 48% active material.

EXAMPLE VIII

In a reaction set up as described in Example I, 300 gms. dipropylene triamine heavy ends were reacted with 600 gms. of the product of Intermediate Example I, supra. The dipropylene triamine heavy ends were heated to 140° C. with the 600 gms. of the product of Intermediate Example I being added continuously between 140–160° C. After the addition was completed the product was held at 170–175° C. for 1½ hours to insure complete reaction. At the end of this time, the reaction product was cooled to 120° C. and 350 gms. of water carefully added. When the product had reached 90° C. it was then further diluted with water to give a finished polyelectrolyte containing 48% active material.

EXAMPLE IX

In a manner similar to Example VIII, 300 gms. of dipropylene triamine heavy ends and 500 gms. of Intermediate Example II, supra, were reacted. On cooling to 110° C., 259 gms. of water were carefully added. On reaching 90° C. the product was further diluted with water to give a finished polyelectrolyte containing approximately 50% active material.

EXAMPLE X

In a manner similar to Example VIII, 300 gms. of dipropylene triamine heavy ends were reacted with 700 gms. of the product of Intermediate Example II, supra. When the product had cooled to 110° C., 346 gms. of water were carefully added. When the product reached 90° C., it was further diluted with water to give a finished polyelectrolyte containing approximately 50% active material.

EXAMPLE XI

In a manner similar to Example VIII, 300 gms. of dipropylene triamine were reacted with 400 gms. of the product of Intermediate Example III, supra. The material was cooled to room temperature, and 568 gms. of water added. A portion of this material was then further diluted to give a finished polyelectrolyte containing approximately 37% active material.

EXAMPLE XII

In a manner similar to Example VIII, 300 gms. of dipropylene triamine were reacted with 600 gms. of the product of Intermediate Example III, supra. When the product had cooled to 115° C., 659 gms. of water were carefully added. On reaching 90° C. the product was further diluted with water to give a finished polyelectrolyte containing approximately 39% active material.

EXAMPLE XIII

In a manner similar to Example VIII, 300 gms. of dipropylene triamine were reacted with 800 gms. of the product of Intermediate Example III, supra. When the material had cooled to approximately 120° C., 725 gms. of water were added. On reaching 90° C. the product was further diluted with water to give a finished polyelectrolyte containing approximately 40% active material.

EXAMPLE XIV

In a manner similar to Example VIII, 300 gms. of dipropylene triamine were reacted with 400 gms. of the product of Intermediate Example IV, supra. When the product had cooled to 110° C., 568 gms. of water were carefully added. After the product had cooled further to 90° C., the product was further diluted with water to give a finished polyelectrolyte containing approximately 37% active material.

EXAMPLE XV

In a manner similar to Example VIII, 300 gms. of dipropylene triamine were reacted with 600 gms. of the product Intermediate Example IV, supra. When the product had cooled to 110° C., 659 gms. of water were added. At 90° C. the product was further diluted with water to give a finished polyelectrolyte containing approximately 39% active material.

EXAMPLE XVI

In a manner similar to Example VIII, 195 gms. of dipropylene triamine were reacted with 651 gms. of the product of Intermediate Example III, supra. On completion of the reaction, 534 gms. of water were carefully added. On reaching 90° C., the product was further diluted with water to give a finished polyelectrolyte containing approximately 41% active material.

EXAMPLE XVII

In a manner similar to Example VIII, 200 gms. of dipropylene triamine were reacted with 666 gms. of the product of Intermediate Example IV, supra. When the reaction was complete, 546 gms. of water were carefully added. On reaching 90° C., the product was further diluted with water to give a finished polyelectrolyte containing approximately 41%.

EXAMPLE XVIII

In a manner similar to Example VIII, 195 gms. of diethylene triamine were reacted with 650 gms. of the reaction product of Intermediate Example IV, supra. When the reaction was completed, 500 gms. of water were carefully added. On reaching 90° C., the product was further diluted with water to give a finished polyelectrolyte containing approximately 41% active material.

EXAMPLE XIX

The following materials were charged to a reaction flask similar to that described in Example I: 105 gms. of 90% diethylene triamine, 585 gms. of the product of Intermediate Example IV, 100 gms. of water. These materials were stirred together and a slight temperature rise was noted, with the maximum of this exotherm being 45° C. It is felt that this is probably due to the heat of the hydration of the amino groups and ether linkages in the intermediates charged rather than to heat of the reaction. Heat was then applied to gradually raise the temperature of the reaction mass to reflux at 112° C. The reflux temperature was reached within thirty minutes and the material was carried at this reflux temperature for an additional two hours. At the end of this time 780 gms. of water were added to give the finished product.

EXAMPLE XX

In a manner similar to that described in Example XIX, 120 gms. of diethylene triamine, 585 gms. of the product of Intermediate Example IV, and 100 gms. of water were charged to a reaction flask. The material was heated as in Example XIX with the reflux temperature in this case being 113° C. At the end of a two-hour period, 820 gms. of water were added to give the finished product.

EXAMPLE XXI

In a manner similar to Example XIX, 137 gms. of diethylene triamine, 585 gms. of the product of Intermediate Example IV, and 100 gms. of water were charged to a reaction flask. These materials were gradually heated to reflux at 112° C. and were further refluxed for a period of two hours at which point the reflux temperature was 113° C. At the end of this two-hour period, 860 gms. of water were added to give the finished product.

The intermediate examples referred to in the foregoing examples of the invention are as follows:

INTERMEDIATE EXAMPLE I

In a three-necked flask fitted with a means of agitation, a thermometer, an addition tube, and reflux condenser, were charged 424 gms. (4 mols) of diethylene glycol 4 ccs. of boron trifluoride etherate complex containing 48% $BF_3$. To this material was added drop-wise over a period of approximately 4 hours, a total of 740 gms. or 8 mols of epichlorohydrin.. The epichlorohydrin addition was started at 27° C. and proceeded exothermically and completed without the addition of an external source of heat at a temperature of 84° C. After the epichlorohydrin addition was completed, the product was gradually heated to 120° C., held at this temperature for a period of 30 minutes, and allowed to cool to room temperature.

INTERMEDIATE EXAMPLE II

In a manner similar to Intermediate Example I, 690 gms. of a polyethylene glycol (3 mols) having a molecular weight of 230, were reacted with 560 gms. (6 mols) of epichlorohydrin in the presence of 5 ccs. of boron trifluoride etherate complex. The epichlorohydrin addition was made at temperatures from 35° C. to 90° C. over a period of approximately two hours. At the end of this time the temperature was raised to 110° C. and held at this temperature for a period of 30 minutes to assure complete reaction.

INTERMEDIATE EXAMPLE III

In a manner similar to Intermediate Example I, 1560 gms. (5 mols) of a polyethylene glycol having a molecular weight of 312 were reacted with 925 gms. (10 mols) of epichlorohydrin. In this case 9.2 ccs. of boron trifluoride etherate was used as a catalyst. After the epichlorohydrin addition was complete, the product was held at 110° C. for a period of approximately 30 minutes and allowed to cool to room temperature.

INTERMEDIATE EXAMPLE IV

In a manner similar to Intermediate Example I, 2100 gms. (5 mols) of a polyethylene glycol having a molecular weight of approximately 420, were reacted with 925 gms. (10 mols) of epichlorohydrin. 9.2 ccs. of boron trifluoride etherate were used as a catalyst. The epichlorohydrin was added at temperatures between 29° C. and 110° C. The addition being completed at 110° C. After the completion of the epichlorohydrin addition, the product was held at 110° C. for a period of approximately 30 minutes and allowed to cool to room temperature.

*Polyelectrolytes containing oxyethylene-oxypropylene polyglycol*

A special feature of this invention is concerned with the use of polyoxyalkylated glycols in the polyelectrolyte compounds of the invention in which the oxyalkylene groups of the polyoxyalkylene glycols constitute oxyethylene and oxypropylene groups. Such polyglycols may be composed of a heteric mixture of oxyethylene and oxypropylene groups in which said groups occur randomly in the polyoxyalkylene chain. These polyoxyalkylene glycols may also be of a character wherein the polyoxyalkylene chains consist of a block-type arrangement of oxyethylene groups and oxypropylene groups, i.e., polyoxyalkylene glycols produced by oxyethylation of a polyoxypropylene glycol or oxypropylation of a polyoxyethylene glycol. In the latter two instances, the polyoxyalkylene glycol may be represented by the formula $$HO(C_2H_4)_x(C_3H_6O)_yH$$

wherein $x$ and $y$ are each whole numbers. These glycols are used in the preparation of the polyelectrolytes of the invention, in order to achieve the hydrophilic-hydrophobic balance whereby the polyelectrolytes of the invention will serve the purpose of demulsifying a water-in-petroleum oil emulsion, as well as rectifying the oil-in-water emulsion part of the over-all treating problem in resolving oil and water emulsions.

An example of a situation in which the polyelectrolytes of the invention can be used in this dual purpose situation is illustrated by a system which produces both types of emulsion simultaneously, but from which the total volume of oil recovered is of the order of 10% or less of the total volume of fluid. Generally, if a greater ratio of oil is being produced, it is more economical to use another emulsion breaking chemical of the oil-soluble type. However, great care must be exercised in the selection of such a chemical pair, since some types work together and others tend to counteract one another. This often gives rise to a greater treating problem than originally existed. Because of the possible problem arising from the use of two chemicals (which must always be used in a proper ratio to one another) it has been found advantageous at times to use a dual purpose chemical of the polyelectrolyte type.

The relative ratio of oxyethylene groups to oxypropylene groups in the aforesaid oxyethylene-oxypropylene glycols will vary, depending upon the emulsion characteristics of the oil being treated. Some experimentation is ordinarily necessary in order to find the optimum ratio of oxyethylene to oxypropylene groups for a particular oil, althought it may be stated in general, that the polyoxyalkylene glycols contemplated by the invention may range from 100% oxyethylene groups to 30% oxyethylene groups and 70% oxypropylene groups. In instances where the oxyethylene and oxypropylene groups occur randomly in the polyoxyalkylene glycol chains, the preferred weight ratio of oxyethylene groups to oxypropylene groups is 70:30 to 30:70. Where the polyoxyalkylene chains of the polyalkylene glycols have the oxypropylene and oxyethylene groups in a block-type arrangement corresponding to the formula above given, the weight ratio of oxyethylene groups to oxypropylene groups preferably is in the area of 75:25 to 50:50.

This aspect of the invention is further illustrated in the following examples.

EXAMPLE XXII

In a manner similar to Example I, 500 gms. (1 mol) of a polyglycol derived from a mixture of ethylene and propylene oxides, wherein the weight ratio of ethylene oxide to propylene oxide is 2:1 were reacted with 2 mols of epichlorohydrin. 3 ccs. of boron trifluoride ether complex was used as a catalyst. The epichlorohydrin was added to the combination of polyglycol and catalyst at temperatures between 90–110° C. After the epichlorohydrin addition was completed the product was held at 110° C. for a period of approximately 30 minutes and allowed to cool to room temperature.

EXAMPLE XXIII

In a manner similar to Example VIII, 200 gms. of dipropylenetriamine is reacted with 680 gms. of the product of Example XXII. When the reaction was complete, the product was carefully diluted with water to give a finished polyelectrolyte containing 40% active material.

EXAMPLE XXIV

In a manner similar to Example VIII, 140 gms. of diethylenetriamine was reacted with 680 gms. of the product of Example XXII. When the reaction was completed, the product was carefully diluted with water to give a finished polyelectrolyte containing 40% active material.

Polyelectrolyte amphoteric metal salt blends

We have previously described the compatibility of the polyelectrolytes of the invention with strong electrolytes which are amphoteric metal salts such as zinc chloride. These blends constitute preferred embodiments of the invention as reversed emulsion breakers. Such blends are prepared by dissolving zinc chloride in the aqueous solutions of the polyelectrolytes of the invention or by blending zinc chloride aqueous solutions with the polyelectrolyte solutions. The weight ratio of zinc chloride to the polyelectrolytes in these blends will, for most purposes, fall within the range of 0.1 part to 2 parts of zinc chloride per part of polyelectrolyte (dry basis).

The following examples constitute additional embodiments of the invention illustrating the aforesaid blends with zinc chloride. Other salts which can be use used in place of zinc chloride are aluminum chloride or aluminum sulfate. The salts of the amphoteric metals appear to operate with greatest efficiency, zinc aluminum salts being preferred over nickel and cobalt for economic reasons. Other salts which can also be used in these blends include salts of the alkaline earth metals such as $CaCl_2$, $MgCl_2$, as well as the highly water-soluble iron salts such as $FeSO_4$, $FeCl_3$, and $Fe(NO_3)_3$.

EXAMPLE XXV

To the polyelectrolyte solution of Example VI there is added sufficient amount of a 40% zinc chloride solution to provide a 15% by weight concentration of zinc chloride in the polyelectrolyte-zinc chloride blend.

EXAMPLE XXVI

To the polyelectrolyte solution of Example VI there is added sufficient amount of a 40% zinc chloride solution to provide a 25% by weight concentration of zinc chloride in the polyelectrolyte-zinc chloride blend.

EXAMPLE XXVII

To the polyelectrolyte solution of Example VII there is added sufficient amount of a 40% zinc chloride solution to provide a 15% by weight concentration of zinc chloride in the polyelectrolyte-zinc chloride blend.

EXAMPLE XXVIII

To the polyelectrolyte solution of Example VII there is added sufficient amount of a 40% zinc chloride solution to provide a 25% by weight concentration of zinc chloride in the polyelectrolyte-zinc chloride blend.

EXAMPLE XXIX

To the polyelectrolyte solution of Example VII there is added sufficient amount of a 40% zinc chloride solution to provide a 15% by weight concentration of zinc chloride in the polyelectrolyte-zinc chloride blend.

EXAMPLE XXX

To the polyelectrolyte solution of Example VIII there is added sufficient amount of a 40% zinc chloride solution to provide a 25% by weight concentration of zinc chloride in the polyelectrolyte-zinc chloride blend.

EXAMPLE XXXI

To the polyelectrolyte solution of Example IX there is added sufficient amount of a 40% zinc chloride solution to provide a 15% by weight concentration of zinc chloride in the polyelectrolyte-zinc chloride blend.

EXAMPLE XXXII

To the polyelectrolyte solution of Example IX there is added sufficient amount of a 40% zinc chloride solution to provide a 25% by weight concentration of zinc chloride in the polyelectrolyte-zinc chloride blend.

EXAMPLE XXXIII

To the polyelectrolyte solution of Example X there is added sufficient amount of a 40% zinc chloride solution to provide a 15% by weight concentration of zinc chloride in the polyelectrolyte-zinc chloride blend.

EXAMPLE XXXIV

To the polyelectrolyte solution of Example X there is added sufficient amount of a 40% zinc chloride solution to provide a 25% by weight concentration of zinc chloride in the polyelectrolyte-zinc chloride blend.

The solutions of the treating chemicals of the invention may contain additional compounds. For example, the aqueous solutions heretofore set forth in the description of the invention and in the specific examples thereof may contain 3–10 volume percent methanol, ethanol, ethylene glycol or the like antifreeze agents to help prevent the solutions from freezing at low temperature and to serve as a viscosity controlling agent at low temperatures. It is also advantageous to add a corrosion inhibitor to the solutions containing zinc chloride or other corrosive salts. An example of such a corrosion inhibitor is thiourea, which is added to the solutions exemplified by Examples XXII to XXXI in an amount in the range of 0.3–0.8% by weight.

The invention is hereby claimed as follows:

1. A process for breaking an oil-in-water emulsion which comprises mixing with said emulsion a polycondensate selected from the group consisting of (a) a polycondensate having a molecular weight of at least 1000 of epichlorohydrin and a polyalkylene polyamine of the formula $H_2N(R\text{—}NH)_{2-9}H$ wherein R is selected from the group consisting of ethylene, propylene-1,2 and propylene-1,3, (b) a polycondensate having a molecular weight of at least 1000 of epichlorohydrin and a precondensate of a polyalkylene polyamine of the formula $H_2N(R\text{—}NH)_{2-9}H$ wherein R is as aforedefined and a polyoxyalkylene glycol wherein the oxyalkylene groups are selected from the group consisting of solely oxyethylene groups, both oxyethylene and oxypropylene groups, and both oxyethylene and oxybutylene groups, (c) a polycondensate having a molecular weight of at least 1000 of epichlorohydrin, a polyalkylene polyamine of the formula $H_2N(R\text{—}NH)_{2-9}H$ wherein R is as aforedefined, and an epichlorohydrin adduct of an aliphatic glycol, and (d) a polycondensate having a molecular weight of at least 1000 of a polyalkylene polyamine of the formula $$H_2N(R\text{—}NH)_{2-9}H$$

wherein R is as aforedefined and an epichlorohydrin adduct of a lower alkylene glycol, and resolving the broken emulsion into its water and oil phases.

2. A process as claimed in claim 1 wherein said polycondensate is used as a blend with a strong electrolyte salt of an amphoteric metal in a weight ratio of 0.2–2 parts of said strong electrolyte salt per part of said polycondensate.

3. A process as claimed in claim 2 wherein said strong electrolyte salt is zinc chloride in a weight ratio of 0.2 to 2 parts of zinc chloride per part of said polycondensate.

4. A process for breaking an oil-in-water emulsion which comprises mixing with said emulsion a polycondensate having a molecular weight of at least 1000 of epichlorohydrin and a polyalkylene polyamine of the formula $HN\text{—}(R\text{—}NH)_{2-9}H$ wherein R is selected from the group consisting of ethylene, propylene-1,2, and propylene-1,3, and resolving the broken emulsion into its oil and water phases.

5. A process as claimed in claim 4 wherein said polycondensate is used as a blend with zinc chloride in a weight rato of 0.2 to 2 parts zinc chloride per part of said polycondensate.

6. A process for breaking an oil-in-water emulsion which comprises mixing with said emulsion a polycondensate having a molecular weight of at least 1000 of (a) epichlorohydrin and (b) a precondensate of a polyalkylene polyamine of the formula $HN\text{—}(R\text{—}NH)_{2-9}H$ wherein R is selected from the group consisting of ethylene, propylene-1,2, and propylene-1,3 and a polyoxyalkylene glycol chloride having a molecular weight in te range of about 100–800, said epichlorohydrin being polycondensed at a mol ratio of 1.5–2.0 mols of epichlorohydrin per mol of said precondensate, and resolving the broken emulsion into its oil and water phases.

7. A process as claimed in claim 6 wherein said polycondensate is used as a blend with zinc chloride in a weight ratio of 0.2 to 2 parts zinc chloride per part of said polycondensate.

8. A process for breaking an oil-in-water emulsion which comprises mixing with said emulsion a polycondensate having a molecular weight of at least 1000 of a (a) precondensate of epichlorohydrin and a polyalkylene polyamine of the formula $H_2N(R-NH)_{2-9}H$ wherein R is an alkylene group of 2–3 carbons, said precondensate being a condensate of 1–1.5 mols of said epichlorohydrin per mol of said polyalkylene polyamine, and (b) an epichlorohydrin adduct of an aliphatic glycol prepared at a mol ratio of 1–2.2 mols of said epichlorohydrin per mol of said aliphatic glycol, and resolving the broken emulsion into its oil and water phases.

9. A process as claimed in claim 8 wherein said polycondensate is used as a blend with zinc chloride in a weight ratio of 0.2 to 2 parts zinc chloride per part of said polycondensate.

10. A process for breaking an oil-in-water emulsion which comprises mixing with said emulsion a polycondensate having a molecular weight of at least 1000 of an (a) epichlorohydrin, (b) an epichlorohydrin adduct of an aliphatic glycol prepared at a mol ratio of 1–2.2 mols of said epichlorohydrin per mol of said aliphatic glycol, and (c) a polyalkylene polyamine of the formula $H_2N(R-NH)_{2-9}H$ wherein R is a lower alkylene group of 2–3 carbons at a mol ratio of (a):(b):(c) of 0.5–1:1–3:1, respectively, and resolving the broken emulsion into its oil and water phases.

11. A process as claimed in claim 10 wherein said polycondensate is used as a blend with zinc chloride in a weight ratio of 0.2 to 2 parts zinc chloride per part of said polycondensate.

References Cited by the Examiner

UNITED STATES PATENTS

| | | | |
|---|---|---|---|
| 2,469,683 | 3/1949 | Dudley et al. | 260—384 X |
| 2,915,476 | 12/1959 | Shen | 252—341 |
| 2,921,050 | 1/1960 | Belanger | 260—584 X |
| 3,004,924 | 10/1961 | Kirkpatrick et al. | 260—344 |
| 3,029,265 | 4/1962 | Zech | 260—584 X |
| 3,150,102 | 9/1964 | Kirkpatrick et al. | 252—344 |

LEON D. ROSDOL, *Primary Examiner.*

JULIUS GREENWALD, *Examiner.*

H. B. GUYNN, *Assistant Examiner.*

UNITED STATES PATENT OFFICE
CERTIFICATE OF CORRECTION

Patent No. 3,272,757                                       September 13, 1966

Willard H. Kirkpatrick et al.

It is hereby certified that error appears in the above numbered patent requiring correction and that the said Letters Patent should read as corrected below.

Column 9, line 51, for "Example VII" read -- Example VIII --.

Signed and sealed this 5th day of September 1967.

(SEAL)
Attest:

ERNEST W. SWIDER                                  EDWARD J. BRENNER
Attesting Officer                               Commissioner of Patents